Nov. 26, 1935.　　　G. C. J. GRAY　　　2,022,561
COMBINED GARDEN AND LAWN TOOL
Filed Aug. 8, 1933　　　2 Sheets-Sheet 1
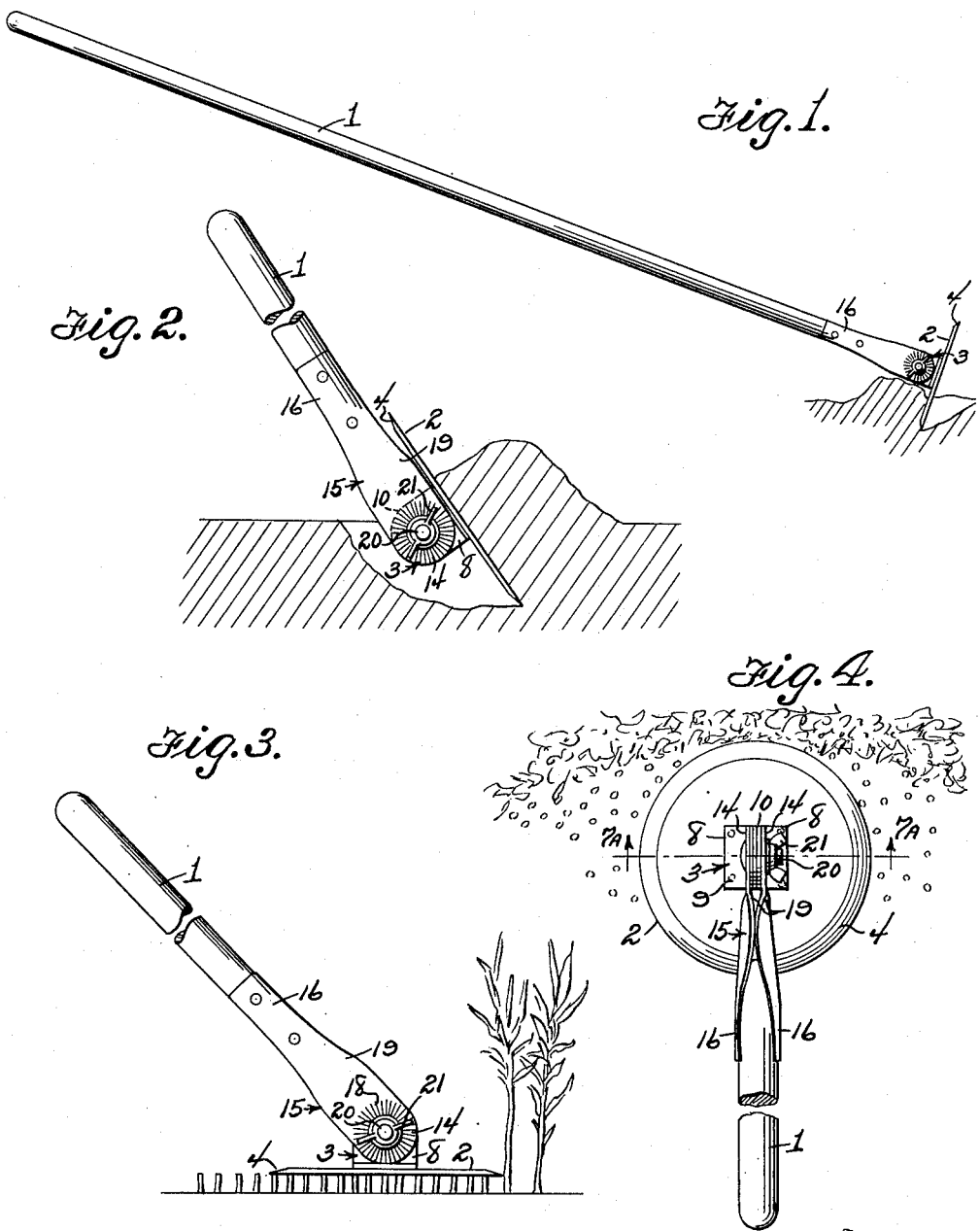
Inventor:
Garold C. J. Gray,
By C. C. Hines,
Attorney.

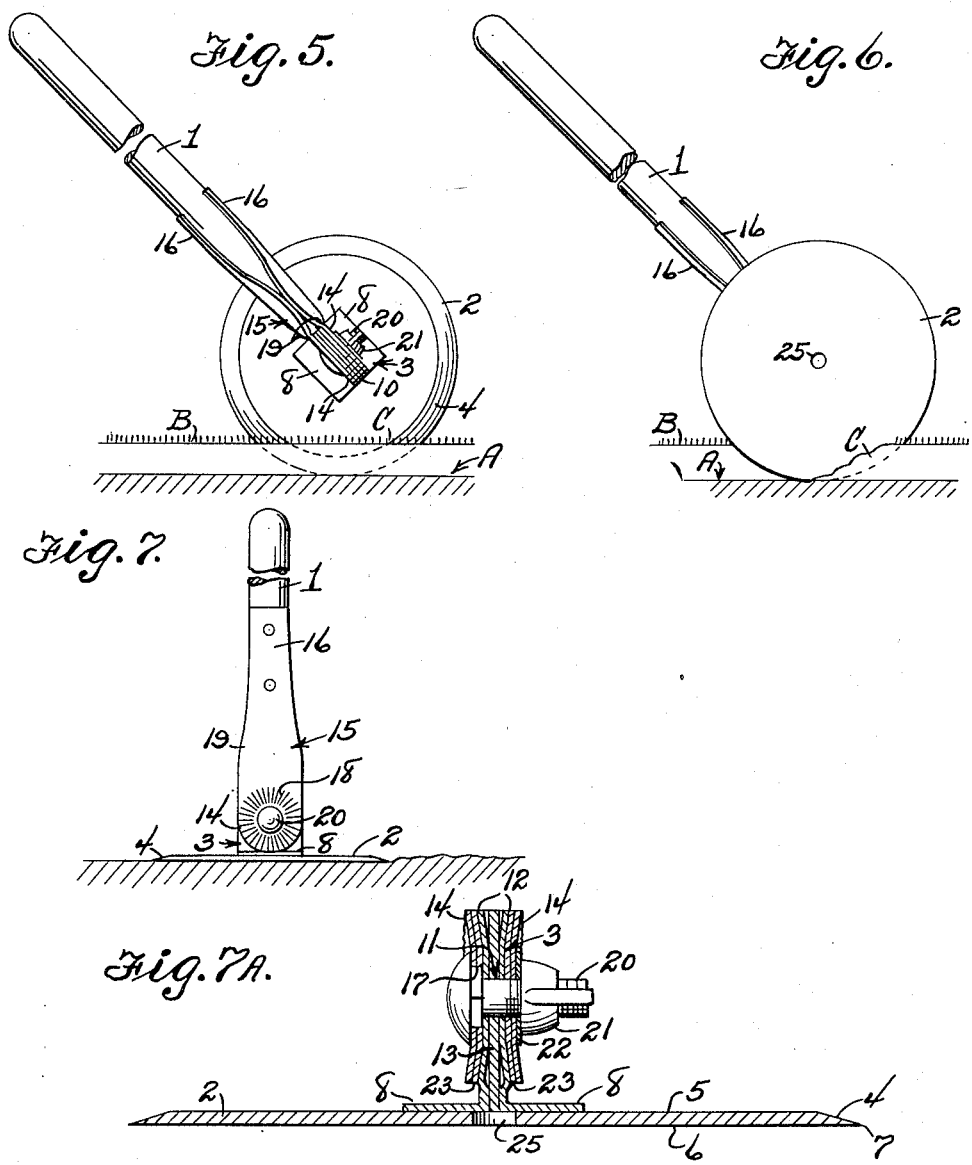

Patented Nov. 26, 1935

2,022,561

UNITED STATES PATENT OFFICE 2,022,561

COMBINED GARDEN AND LAWN TOOL

Garold C. J. Gray, Hastings, Nebr., assignor of seven-eighths to Frank A. Sanford, Hastings, Nebr.

Application August 8, 1933, Serial No. 684,275

1 Claim. (Cl. 97—70)

This invention relates to certain new and useful improvements in hand-operated groundworking and vegetation-cutting tools, and has special reference to a combination type of tool designed and adapted to serve as a hoe, shovel, weed cutter or scythe, lawn edger or trimmer, sod cutter and ground tamper, and for performing other sundry and kindred operations, whereby a simple and all-around type of tool is provided for general gardening and lawn work.

One object of the invention is to provide a simple, efficient and easily operated tool of this character embodying as an essential element thereof a flat circular cutting or tamping disk having its rim portion beveled at one side to form a cutting edge of highly efficient type for cutting and other working actions, which disk lends itself to a novel method of production at low cost.

A further object of the invention is to provide a novel mode of mounting the circular cutting disk on an operating handle for ready adjustment to different working positions, whereby the disk is adapted to perform a variety of working functions and whereby in any peripheral working position of the disk a cutting edge will be presented for use.

A still further object of the invention is to provide a tool of the character described which has the desirable quality of being free from heavy and cumbersome parts and of being sufficiently light in weight to be operated by man, woman or child, even of delicate build for lengthy periods with much less effort and fatigue than required and experienced in the operation of an ordinary garden hoe.

A still further object of the invention is to provide a simple, strong and durable type of adjustable mount for securing the blade to the tool handle, whereby light metal in the construction of the parts of the mounting may be advantageously used.

With these and other objects in view, the invention consists of the features of construction, combination and arrangement of parts, hereinafter fully described and claimed, reference being had to the accompanying drawings, in which:—

Fig. 1 is a side elevation of the tool showing the disk as arranged to adapt the tool for use as a hoe.

Fig. 2 is a view similar to Fig. 1 showing the disk as arranged to adapt the tool to serve as a spade or shovel.

Fig. 3 is a view similar to Figs. 1 and 2 showing the blade as arranged to adapt the tool for use as a scythe or weed cutter.

Fig. 4 is a plan view of the tool arranged for use as shown in Fig. 3.

Fig. 5 is a side elevation of the tool showing the disk as arranged to form a dividing line of cut along the margin of a lawn for an edge trimming action.

Fig. 6 is a view similar to Fig. 5 showing the disk as arranged to remove the border strip outside the cut margin formed as shown in Fig. 5.

Fig. 7 is a view showing the disk as arranged to adapt the tool for use as a tamper.

Fig. 7a is a cross-section on the line 7a—7a of Fig. 5.

In the practical embodiment of the invention as herein disclosed, the tool comprises an operating handle 1, of wood, metal or composite construction, a cutting disk or blade 2, and a mount or fastening connection, generally designated at 3, for adjustably securing the disk or blade to the forward end of the handle.

The disk or blade 2 comprises a flat circular disk of sheet metal of suitable gage or thickness and of suitable diameter for use. This blade is provided wtih a beveled peripheral surface 4 extending continuously from one of its side faces 5 to its opposite side face 6 and forming at its angle of intersection with the latter a sharp cutting edge 7.

The mount 3 for adjustably securing the disk or blade 2 to the handle 1 preferably comprises a bracket formed of a pair of bracket plates 8 secured to the center of the beveled edge side 5 of the blade by spot welding or other fastening methods or means as indicated at 9, and these bracket plates are provided with rearwardly extending partially circular ears 10, each having therein a bolt hole or opening 11 registering with the opening in the other ear, and each provided with an annular series of locking grooves 12 radiating from and extending about its opening. These bracket plates may be made of heavy sheet metal, if desired, in which event the ears 10 may lie directly in abutting relation, but comparatively light sheet metal may be employed, in which event an apertured reinforcing or filler plate 13 is provided between the ears and spot welded or otherwise suitably secured thereto to provide a two-part bracket member with a three-ply attachment lug which, while made of light metal, will at the same time be of great strength and durability. The attachment lug or tongue of the two-part bracket thus formed by ears 10 is fitted between ears 14 formed upon the forward ends or fork arms 15 of bracket plates 16 bolted, riveted or otherwise suitably secured to the forward end of the handle 1. The ears 14, like the ears 10, are of partially circular formation and provided with square or other angular openings 17 to register with the openings 11 and with reinforcing and locking grooves 18. As shown, the brackets and their fork arms are preferably of curved cross-section to properly fit against the handle and to increase the strength of the bracket members, and the fork arms extend convergently forward from the end of the handle and abut at the point 19 in rear of the ears 14, the ears extending normally in parallel relation forwardly from this point, and the abutting portions 19 providing a fulcrum point on which the ears may bend or flex for effective clamping and releasing actions.

A clamping bolt 20 is provided for passage through the openings 11 in the bracket ears on the cutting disk and opening 17 of the ears of the bracket members on the handle for the purpose of adjustably clamping the bracket members together to hold the disk fixed in a desired position of adjustment. This bolt may be inserted from either side of the mount and has a head with an angular shank portion at one end to fit within one of the circular openings 17 to hold the bolt from rotation and on the bolt is a wing nut 21 cooperating with a washer 22 for engagement with the ear at the opposite side of the handle bracket whereby the bolt is held in position and adjusted for the clamping action. It will be obvious from this construction that by tightening the wing nut the ears 14 may be drawn together for clamping engagement with the ears 10 to hold the disk in a fixed position, while upon slacking or removing the nut the ears 14 will spread by their resiliency, thus releasing the disk or blade for a different adjustment or removal as desired. The bracket members upon the handle may be made of sheet metal of any suitable gage or thickness to allow the desired amount of resiliency while securing adequate strength. In the present instance the use between the ears 14 and fork arms 15 of reinforcing plates or strips 23, is shown, which plates or strips are corrugated for interlocking engagement with the grooves on the ears 10 in the clamping action of the clamping bolt and serve to strengthen the fork arms and ears of the bracket members to the requisite degree. By this means the necessity of employing bracket members of heavy gage sheet metal throughout their length is avoided, but in practice the reinforcing strips may be omitted and heavy gage bracket members employed, in which event the grooves formed upon the ears 14 will directly interlock with the grooves upon the ears 10, as will be readily understood.

Figs. 1 to 7, inclusive, show some of the various positions to which the cutting disk or blade may be adjusted relative to the handle to adapt the tool for various uses. Fig. 1 shows an arrangement in which the disk or blade is disposed so as to extend at right angles to the axis of the handle with its beveled edge facing rearwardly, in which position the blade is adapted for ground working operations similar to those performed by an ordinary hoe blade, so that the tool is adapted to perform the functions of a hoe. In this position of the disk or blade with relation to the handle the tool may also be employed as a tamper, as shown in Fig. 7, by bringing the handle to a vertical position so that the outer or front face of the disk may be employed for tamping loose soil or sod in a convenient and effective manner.

Fig. 2 shows an arrangement in which the blade or disk is swung upward to a vertical position substantially parallel with the plane of or at a slight angle to the handle so as to adapt the tool to be used like a spade or shovel in sod cutting, digging and earth removal or transfer actions.

Figs. 3 and 4 show an arrangement in which the disk or blade is arranged to lie substantially at an oblique angle to the handle or at such convenient angle to adapt the tool to be used for weed cutting and similar operations after the manner of a scythe. In this operation it will of course be understood that the tool is swung from right to left or reversely to cause the blade to sweep across the surface of the ground to cut down the weeds as close to the ground as desired.

Fig. 5 shows an arrangement in which the blade or cutting disk disposed at one side of the handle and parallel therewith is employed for cutting a division line along the border of a lawn for the removal of a margin strip, as in an edging action, while Fig. 6 shows the use of the tool for cutting away the edge strip. In the first operation illustrated by Fig. 5 the tool is disposed so that the blade lies on the inner side of the handle, or the side inwardly of the border edge, with its edged side facing the border edge, and the tool with the blade or disk thus disposed is run along the surface of the ground so that the edge of the disk will cut into the earth and form a division line A between the body portion B of the lawn and a border strip portion C which is to be removed. The tool is then, with the blade still disposed as in Fig. 5 relative to the handle, reversed so that the edged side of the blade faces inwardly and the tool is then moved along the cut line A so that the beveled side of the cutting edge will complete the line of cut at an angle to cause the plain outer surface of the cutting edge to free and push the material of the strip B outwardly to leave a clean cut border.

It will be observed that the lateral edges of the fork arms cooperatively provide abutment surfaces at opposite sides of the handle, which abutment surfaces are straight and parallel with the axis of the handle, and that as the tongue part of the bracket of the blade is adapted, when free, to swing on its pivotal connection from side to side of the handle, the blade may be disposed parallel with the handle either in contact with the abutment surface of the fork arms at one side of the handle, as shown, for example, in Fig. 2, or in contact with the abutment surface of the fork arms at the opposite side of the handle. In this operation the position of the blade is not only reversed, with respect to that side of the handle on which it is arranged for use, but the position of the cutting edge is reversed so far as concerns those portions which were lowermost and uppermost in the first-named position of the blade with respect to the horizontal transverse plane of its pivot, and which become the uppermost and lowermost portions of the cutting edge in the changed position or reversed arrangement of the blade. This allows of the use, in working actions of the blade such as shown in Figs. 1, 5 and 6, of either half of the blade above or below the plane of its pivot, so that if the edge of one half of the blade becomes dull that of the other half of the blade may be brought into position for use by reversing the blade as above set forth, and, by alternately using such portions of the blade, equal wear on all portions of the blade will be ensured, and the operator may use that portion of the blade which is sharpest and best suited for action at the time.

It will, of course, be understood that the cutting disk or blade may also be disposed in other working positions relative to the handle and that it will, in each and every one of these positions, by reason of its circular contour, provide a cutting edge at any point or at any direction about its surface, so that the tool may be used for cutting or digging actions by forward or rearward working motions or by sidewise motions in which the blade or cutting disk is arranged either vertically, horizontally or in any intermediate angular position for a desired working action. Besides these various positions to which the blade or disk may be adjusted, to enable the tool to be used as a general all purpose garden or lawn tool, a material and important advantage gained by the use of a flat circular disk having a continuous peripheral cutting edge is that a disk which is strong and durable but light in weight is provided so that a working tool of the character described may be produced which is sufficiently light in weight to be operated by a man, woman or child and by other than a robust person for a considerable period of time with much less muscular effort and fatigue than is occasioned in the use of an ordinary garden hoe.

From the foregoing description, taken in connection with the drawings, the construction, mode of operation and advantages of my improved tool will be readily understood and appreciated by those versed in the art without a further and extended description. While the construction disclosed is preferred, it will, of course, be understood that changes in the general form, construction and arrangement of the parts, within the scope of the appended claims, may be made without departing from the spirit or sacrificing any of the advantages of the invention.

What is claimed as new is:

A tool of the character described comprising a handle having a forked end portion, the outer sides of the arms of the forked portion being provided with flat abutment surfaces parallel with the axis of the handle, a blade consisting of a flat circular disk having a continuous cutting edge extending around its periphery, a bracket arranged upon one of the flat sides of the blade in the line of its axis and extending between the fork arms of the handle, and a pivot and clamping bolt passing through the fork arms and bracket and pivotally mounting the blade upon the forked end of the handle so as to be disposed on either side of the handle, parallel therewith, or below and at right angles to the plane of such end of the handle, or at any intermediate angle, said blade being adapted when adjusted to either of its said positions parallel with the handle to rest squarely against the flat abutment surface of one of the other of the fork arms and to be reinforced thereby against working strains.

GAROLD C. J. GRAY.